(12) United States Patent
Huang et al.

(10) Patent No.: US 10,425,003 B1
(45) Date of Patent: Sep. 24, 2019

(54) POWER SUPPLY DEVICE

(71) Applicant: Chicony Power Technology Co., Ltd., New Taipei (TW)

(72) Inventors: Wen-Nan Huang, New Taipei (TW); Ching-Kuo Chen, New Taipei (TW); Hsiao-Chih Ku, New Taipei (TW); Wan-Ching Lee, New Taipei (TW)

(73) Assignee: Chicony Power Techology Co., Ltd., New Taipei (TW)

( * ) Notice: Subject to any disclaimer, the term of this patent is extended or adjusted under 35 U.S.C. 154(b) by 0 days.

(21) Appl. No.: 16/248,792

(22) Filed: Jan. 16, 2019

(30) Foreign Application Priority Data

Nov. 14, 2018 (TW) .............................. 107140364 A

(51) Int. Cl.
*H02M 1/08* (2006.01)
*H02M 3/335* (2006.01)
*H02M 1/00* (2006.01)

(52) U.S. Cl.
CPC ....... *H02M 1/083* (2013.01); *H02M 3/33576* (2013.01); *H02M 2001/0058* (2013.01)

(58) Field of Classification Search
CPC ............... H02M 1/083; H02M 1/4241; H02M 2001/0003; H02M 2001/0009; H02M 2001/0058; H02M 3/156; H02M 3/335; H02M 3/158; H02M 3/33507; H02M 3/33576; H02M 3/33592
See application file for complete search history.

(56) References Cited

U.S. PATENT DOCUMENTS

| 5,546,294 | A | 8/1996 | Schutten et al. |
| 6,349,044 | B1* | 2/2002 | Canales-Abarca ..... H02M 1/34 |
| | | | 363/134 |
| 7,042,740 | B2 | 5/2006 | Morimoto et al. |
| 9,143,048 | B2* | 9/2015 | Etoh ..................... H02M 5/458 |
| 9,166,481 | B1* | 10/2015 | Vinciarelli ........ H02M 3/33569 |
| 9,906,131 | B1 | 2/2018 | Lee et al. |
| 2002/0044461 | A1 | 4/2002 | Jang et al. |
| 2008/0084411 | A1* | 4/2008 | Oomori .................. G09G 3/325 |
| | | | 345/211 |

(Continued)

FOREIGN PATENT DOCUMENTS

| CN | 1182647 | 12/2004 |
| CN | 104205604 | 12/2014 |

(Continued)

OTHER PUBLICATIONS

"Notice of allowance of Taiwan Counterpart Application", dated Jun. 12, 2019, p. 1-p. 4.

*Primary Examiner* — Adolf D Berhane
*Assistant Examiner* — Shahzeb K Ahmad
(74) *Attorney, Agent, or Firm* — JCIPRNET

(57) ABSTRACT

A power supply device is provided. The power supply device includes a power converter and a control circuit. The control circuit is coupled to a power converter. The power converter is configured to convert input power to provide output power. The control circuit is configured to receive a control signal and provide a dummy current according to the control signal and the output power, so that the sum of a current value of the dummy current and a current value of the output power is greater than or equal to a threshold value. The power converter can accordingly convert the input power in a soft switching manner.

20 Claims, 7 Drawing Sheets

(56) References Cited

U.S. PATENT DOCUMENTS

| | | |
|---|---|---|
| 2015/0288289 A1 | 10/2015 | Qu et al. |
| 2017/0025969 A1* | 1/2017 | Xu .................... H02M 3/33592 |
| 2018/0131285 A1 | 5/2018 | Stuler |
| 2019/0006935 A1* | 1/2019 | Wang ................ H02M 3/33507 |
| 2019/0058487 A1* | 2/2019 | Xu .......................... H03M 1/68 |

FOREIGN PATENT DOCUMENTS

| | | |
|---|---|---|
| CN | 106558993 | 4/2017 |
| CN | 206962713 | 2/2018 |
| JP | 2015514385 | 5/2015 |
| TW | 200941913 | 10/2009 |
| TW | M382658 | 6/2010 |
| TW | I521850 | 2/2016 |
| TW | I568166 | 1/2017 |
| TW | 201815043 | 4/2018 |

\* cited by examiner

POWER SUPPLY DEVICE

CROSS-REFERENCE TO RELATED APPLICATION

This application claims the priority benefit of Taiwan application serial no. 107140364, filed on Nov. 14, 2018. The entirety of the above-mentioned patent application is hereby incorporated by reference herein and made a part of this specification.

BACKGROUND

Technical Field

The disclosure relates to a power supply device; more particularly, the disclosure relates to a power supply device adopting a soft switching mechanism.

Description of Related Art

Generally, if a power supply device is performed in a hard switching manner, since zero voltage switching (ZVS) and zero current switching (ZCS) cannot be achieved, switching loss may occur while the power supply device is being switched on and off, which further deteriorates the efficiency of the power supply device; what is more, the switch may be damaged due to the rapid increase in the temperature. To effectively reduce the switching loss of the power supply device, a soft switching mechanism has been extensively discussed and researched.

SUMMARY

The disclosure provides a power supply device adopting a soft switching mechanism.

The power supply device includes a power converter and a control circuit. The power converter includes a transformer, a primary-side conversion circuit, and a secondary-side conversion circuit. The primary-side conversion circuit is coupled to a primary side of the transformer. The primary-side conversion circuit is configured to receive input power. The secondary-side conversion circuit is coupled to a secondary side of the transformer. The power converter controls the primary-side conversion circuit and the secondary-side conversion circuit through a plurality of switch signals, so as to convert the input power to provide output power, wherein the switch signals are generated according to the control signal. The control circuit is coupled to the power converter. The control circuit is configured to receive a control signal and provide a dummy current according to the control signal and the output power, so that the sum of a current value of the dummy current and a current value of the output power is greater than or equal to a threshold value. The power converter can accordingly convert the input power in a soft switching manner.

In view of the above, when the power supply device provides the converted output power according to the control signal, the control circuit is configured to receive the control signal and provide a dummy current according to the control signal and the output power. Accordingly, the sum of the current value of the dummy current and the current value of the output power is greater than or equal to a threshold value, whereby the power converter can convert the input power in a soft switching manner.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

In general, if a power supply device intends to adopts a soft switching mechanism to achieve zero voltage switching (ZVS) and zero current switching (ZCS), energy on a resonant inductor should be greater than energy on a resonant capacitor, i.e., the following formula must be satisfied before the soft switching mechanism is adopted:

$$l\_Lr > \frac{c\_Cr \times (v\_Vi)^2}{i\_Ip^2}$$

wherein $l\_Lr$ is an inductance value of the resonant inductor, $c\_Cr$ is a capacitance value of an equivalent parasitic capacitor, $v\_Vi$ is a voltage value of a converter input voltage, and $i\_Ip$ is a current value on the resonant inductor. The inductance value of the resonant inductor in the normal power supply device is fixed and is not too large in consideration of saturation and costs. If the capacitance value of the equivalent parasitic capacitor and the voltage value of the input voltage are fixed, the above-mentioned formula is adjusted as follows:

$$i\_Ip > \sqrt{\frac{c\_Cr}{l\_Lr}} \times v\_Vi$$

It can be learned from the above that if the current value of the resonant current or the output current is greater than a threshold value, the power supply device is allowed to adopt the soft switching mechanism.

Figure 1:
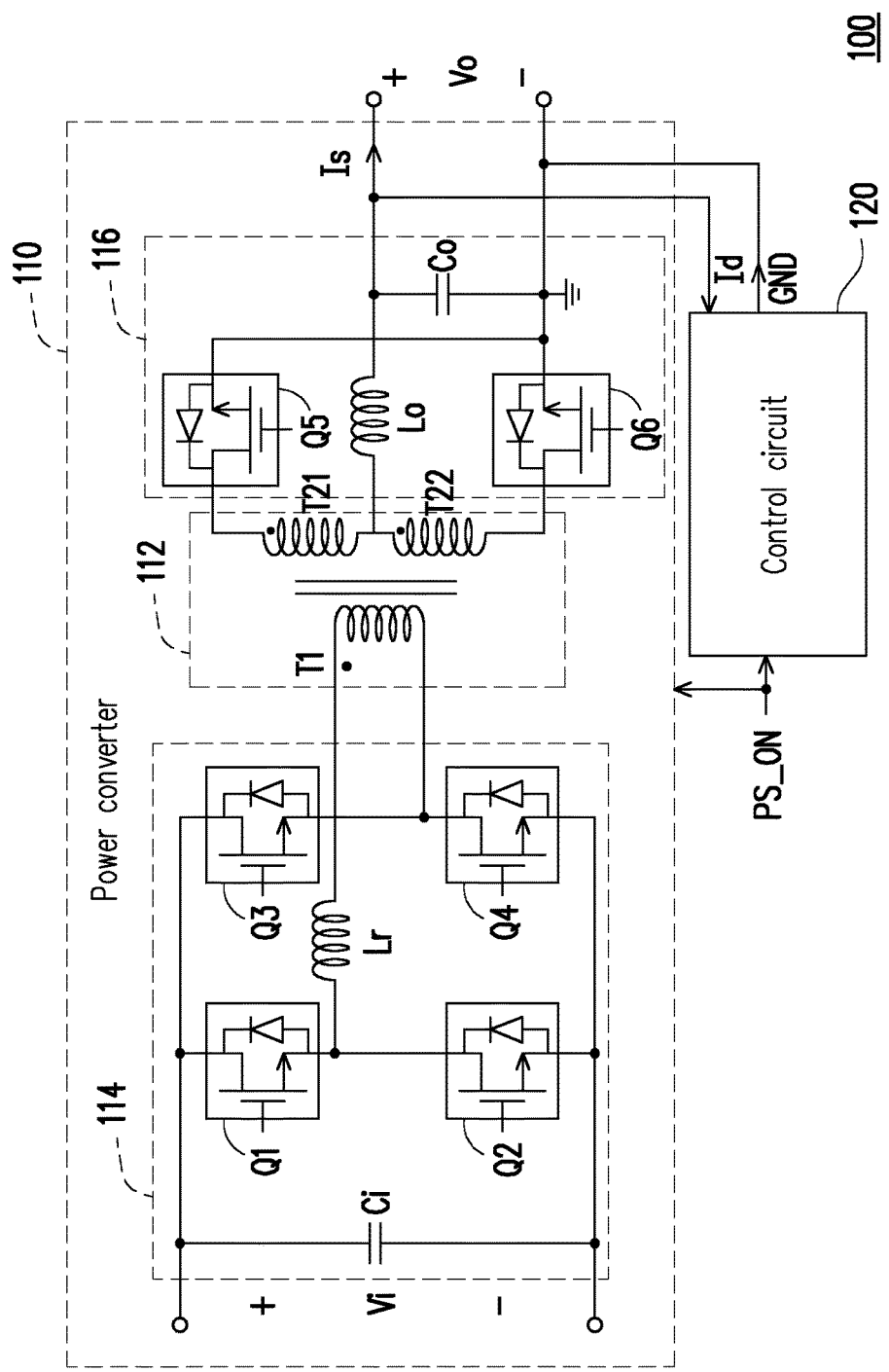
FIG. 1 is a schematic view of a power supply device according to a first embodiment of the disclosure.

Please refer to FIG. 1, which is a schematic view of a power supply device according to a first embodiment of the disclosure. The power supply device 100 includes a power converter 110 and a control circuit 120. The power converter 110 includes a transformer 112, a primary-side conversion circuit 114, and a secondary-side conversion circuit 116. The primary-side conversion circuit 114 is coupled to a primary side of the transformer 112. The primary-side conversion circuit 114 includes an input capacitor Ci, switches Q1-Q4, and a resonant inductor Lr. A first terminal and a second terminal of the input capacitor Ci are configured to receive input power Vi. The secondary-side conversion circuit 116 includes switches Q5 and Q6, a filtering inductor Lo, and a filtering capacitor Co. The secondary-side conversion circuit 116 is coupled to a secondary side of the transformer 112.

The power converter 110 receives a control signal PS_ON. The control signal PS_ON is, for instance, an activation signal having logic level. When receiving the control signal PS_ON, the power converter 110 generates a plurality of switch signals S according to the control signal PS_ON. The power converter 110 controls the switches Q1-Q4 of the primary-side conversion circuit 114 and the switches Q5 and Q6 of the secondary-side conversion circuit 116 through the switch signals S, so as to convert the received input power Vi and provide the converted output power Vo through the first terminal and the second terminal of the filtering capacitor Co. The control circuit 120 is coupled to the power converter 110. The control circuit 120 is also configured to receive the control signal PS_ON. The control circuit 120 provides a dummy current Id according to the control signal PS_ON and the output power Vo. Hence, the power converter 110 and the control circuit 120 can simultaneously receive the control signal PS_ON. At this time, the power converter 110 generates a current value Is of the output power Vo, and the control circuit 120 also generates the dummy current Id. As such, the sum of the current value of the dummy current Id and the current value Is of the output power Vo is greater than or equal to a threshold value. Thereby, the power converter 110 can convert the input power Vi in a soft switching manner.

As to the primary-side conversion circuit 114, in the present embodiment, a first terminal of the switch Q1 is coupled to the first terminal of the input capacitor Ci, and a second terminal of the switch Q1 is coupled to a first terminal of the switch Q2. A second terminal of the switch Q2 is coupled to the second terminal of the input capacitor Ci. A first terminal of the switch Q3 is coupled to the first terminal of the input capacitor Ci, and a second terminal of the switch Q3 is coupled to a first terminal of the switch Q4. A second terminal of the switch Q4 is coupled to the second terminal of the input capacitor Ci. A first terminal of the resonant inductor Lr is coupled between the second terminal of the switch Q1 and a first terminal of a primary coil T1 of the transformer 112. A second terminal of the primary coil T1 of the transformer 112 is coupled to the second terminal of the switch Q3 and the first terminal of the switch Q4. In some embodiments, at least one of the resonant capacitor and a power factor correction circuit may be added to the primary-side conversion circuit 114 according to design requirements. The primary-side conversion circuit described herein is not limited to the primary-side conversion circuit 114 provided in the present embodiment.

As to the secondary-side conversion circuit 116, in the present embodiment, a first terminal of the switch Q5 of the secondary-side conversion circuit 116 is coupled to an output terminal of a secondary coil T21. A first terminal of the switch Q6 is coupled to an output terminal of the secondary coil T22. A second terminal of the switch Q6 is coupled to a second terminal of the switch Q5. A first terminal of the filtering inductor Lo is coupled to a tapping point of the secondary coils T21 and T22. A second terminal of the filtering inductor Lo is coupled to a first terminal of the filtering capacitor Co. A second terminal of the filtering capacitor Co is coupled to a ground potential.

Figure 2:
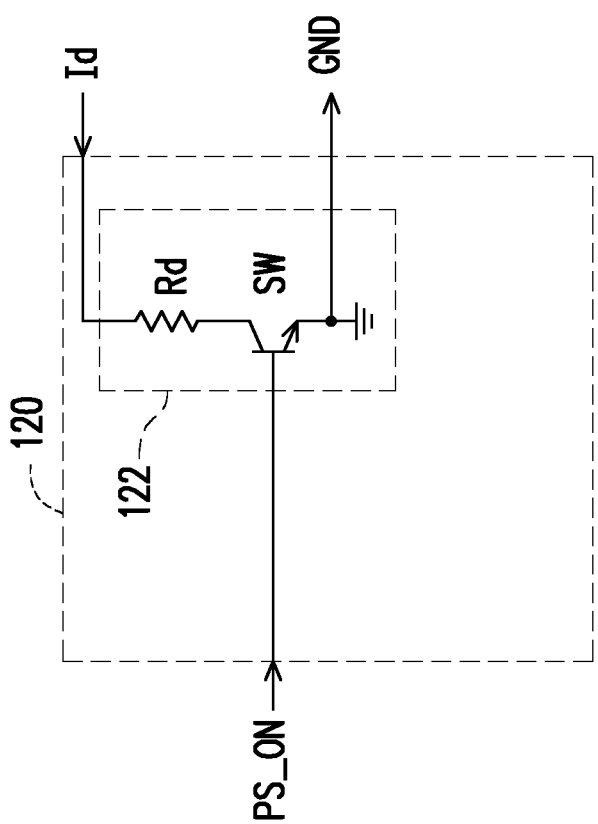
FIG. 2 is a schematic view of a control circuit according to the first embodiment of the disclosure.

Please refer to FIG. 1 and FIG. 2. FIG. 2 is a schematic view of a control circuit according to the first embodiment of the disclosure. In the present embodiment, the control circuit 120 includes a dummy current providing circuit 122. The dummy current providing circuit 122 is coupled to the secondary-side conversion circuit 116. The dummy current providing circuit 122 is configured to provide the dummy current Id to the secondary-side conversion circuit 116 according to the control signal PS_ON and the output power Vo. The dummy current providing circuit 122 further includes a dummy resistor Rd and a switch SW. A first terminal of the dummy resistor Rd is coupled to the secondary-side conversion circuit 116. A first terminal of the switch SW is coupled to a second terminal of the dummy resistor Rd. A second terminal of the switch SW is coupled to a reference voltage source (e.g., a ground voltage GND) and the secondary-side conversion circuit 116. When the switch SW is switched on, the output power Vo provides the dummy current Id through the dummy resistor Rd.

To be more specific, in the present embodiment, the switch SW of the dummy current providing circuit 122 may be, for instance, a proper transistor switch, and the switch SW provided in the present embodiment is implemented in form of a bipolar junction transistor (BJT). In some embodiments, the switch SW may be implemented in form of a metal-oxide-semiconductor field-effect transistor (MOSFET). The switch SW further has a control terminal. The control terminal of the switch SW is configured to receive the control signal PS_ON and is switched on according to the control signal PS_ON. When the control circuit 120 receives the control signal PS_ON, the switch SW is switched on, and therefore the output power Vo provides the dummy current Id according to the resistance of the dummy resistor Rd. Hence, when receiving the control signal PS_ON, the power supply device 100 obtains the dummy current Id. In addition, the sum of the current value of the dummy current Id and the current value of the output power Vo is greater than or equal to the threshold value, whereby the power converter 110 can convert the input power Vi in a soft switching manner.

By contrast, if the control circuit 120 does not receive the control signal PS_ON, the switch SW is switched off, and therefore the control circuit 120 does not provide the dummy current Id. The power converter 110 does not obtain any switch signal S and thus does not convert the input power Vi.

Figure 3:
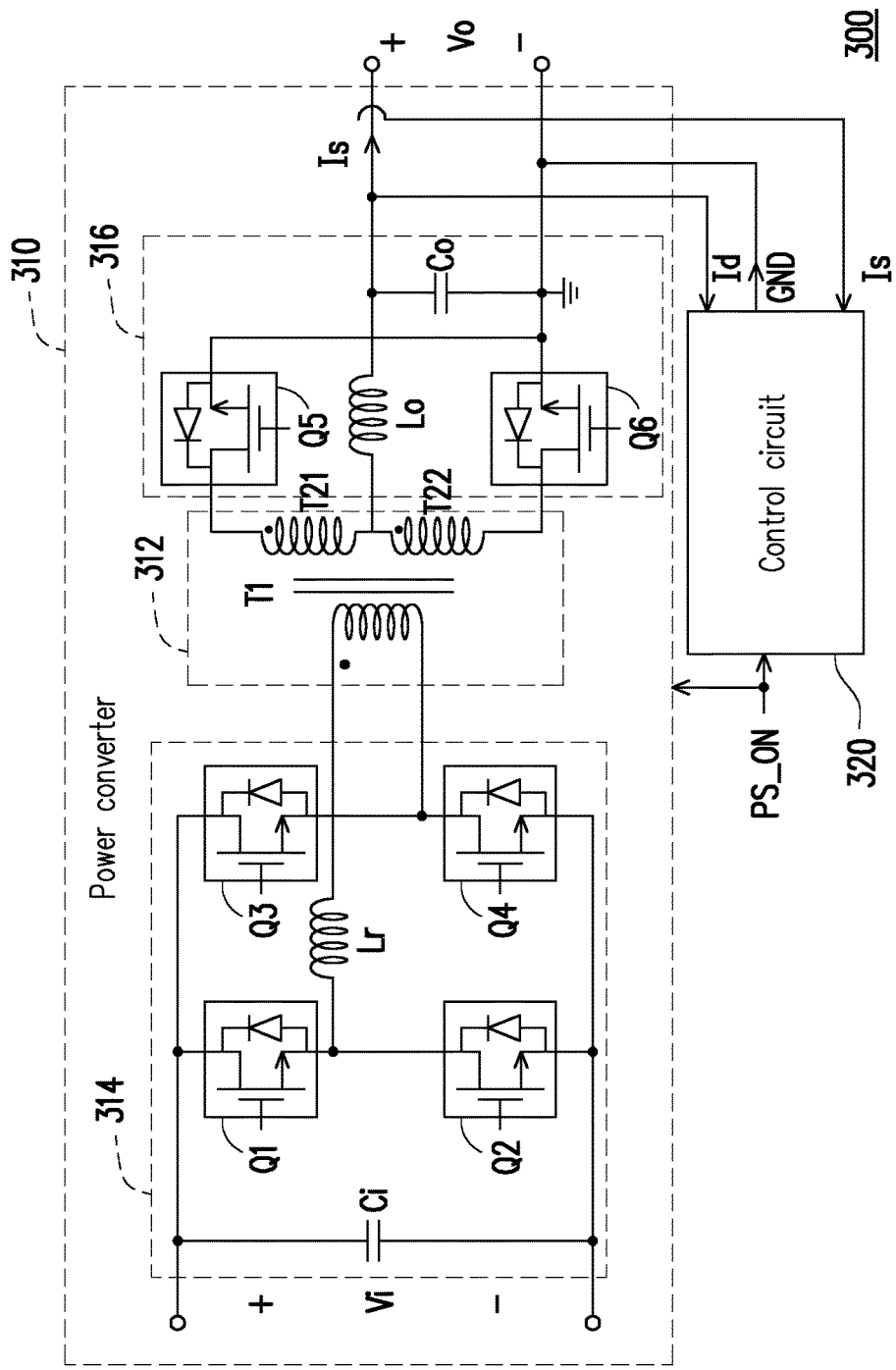
FIG. 3 is a schematic view of a power supply device according to a second embodiment of the disclosure.
Figure 4:
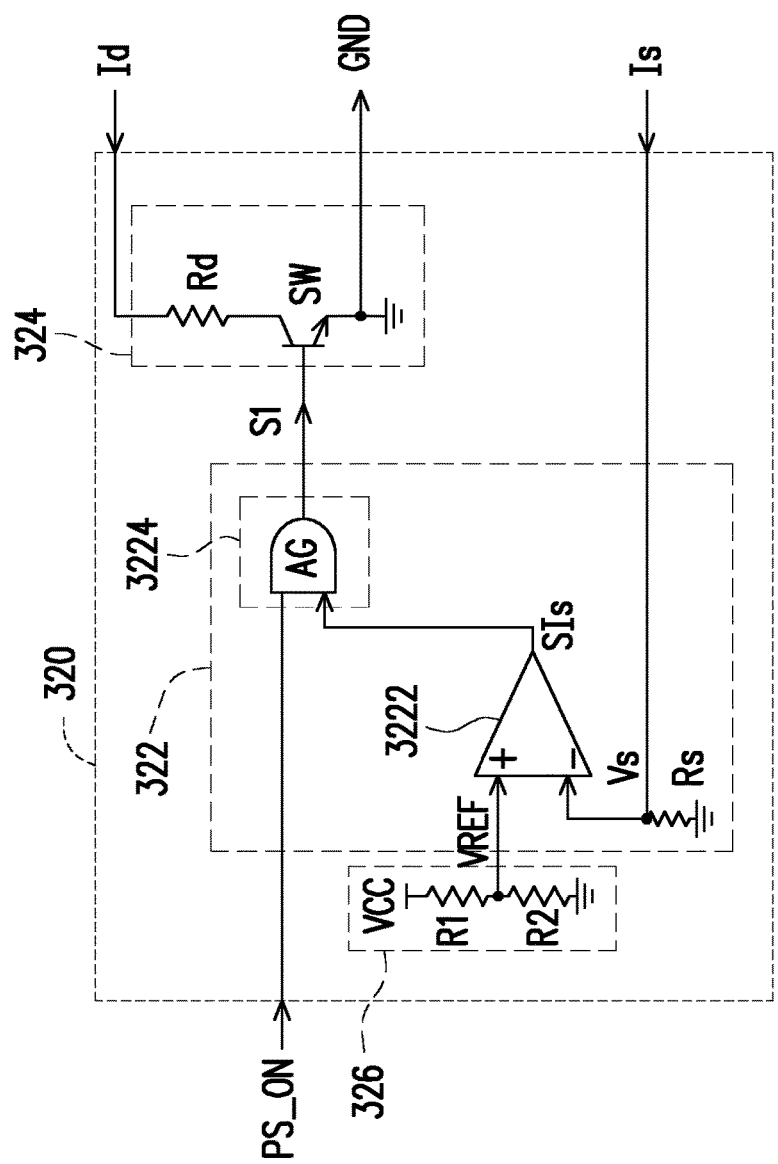
FIG. 4 is a schematic view of a control circuit according to the second embodiment of the disclosure.

Please refer to FIG. 3 and FIG. 4. FIG. 3 is a schematic view of a power supply device according to a second embodiment of the disclosure. FIG. 4 is a schematic view of a control circuit according to the second embodiment of the disclosure. The difference between FIG. 3 and FIG. 1 lies in that the control circuit 320 depicted in FIG. 3 is further configured to receive the current value Is of the output power Vo from a power converter 310, and the current value Is of the output power Vo serves as a basis of adjusting the dummy current Id. The control circuit 320 of the power supply device 300 includes a determination circuit 322 and a dummy current providing circuit 324. The determination circuit 322 is coupled to the control terminal of the switch SW of the dummy current providing circuit 324. The determination circuit 322 is configured to receive the output power Vo and the control signal PS_ON and control the switch SW to be switched on or off according to the current value Is of the output power Vo and the control signal PS_ON. The circuitry of the dummy current providing circuit 324 and the corresponding implementation details can be well learned from the teachings of the dummy current providing circuit 122 provided in the first embodiment, and therefore no other explanations are further given hereinafter.

In particular, the determination circuit 322 of the control circuit 320 includes a comparator 3222 and a logic operation circuit 3224. The comparator 3222 is configured to receive the current value Is of the output power Vo and provide an output current level determination signal SIs according to the current value Is of the output power Vo. An inverting input terminal of the comparator 3222 is coupled to a resistor Rs, is configured to receive the current value Is of the output power Vo, and generates a sensing voltage value Vs according to the current value Is of the output power Vo and a resistance of the resistor Rs. A non-inverting input terminal of the comparator 3222 is configured to receive a predetermined voltage value VREF. The comparator 3222 compares the sensing voltage value Vs and the predetermined voltage value VREF and provides the output current level determination signal SIs to an output terminal of the comparator 3222 according to the comparison result. That is, in response to the comparison result of the sensing voltage value Vs and the predetermined voltage value VREF, the comparator 3222 provides the output current level determination signal SIs.

In the present embodiment, the control circuit 320 is further configured to provide a voltage dividing circuit 326 of the predetermined voltage value VREF. The voltage dividing circuit 326 has voltage dividing resistors R1 and R2. A first terminal of the voltage dividing resistor R1 is coupled to a system voltage VCC. A second terminal of the voltage dividing resistor R1 is coupled to a first terminal of the voltage dividing resistor R2. A second terminal of the voltage dividing resistor R2 is coupled to the reference voltage source (e.g., grounded). After dividing the system voltage VCC, the voltage dividing circuit 326 provides the predetermined voltage value VREF to the non-inverting input terminal of the comparator 3222 through the second terminal of the voltage dividing resistor R1.

In the present embodiment, if the comparator 3222 determines that the sensing voltage value Vs is less than the predetermined voltage value VREF, the output current level determination signal SIs at a first logic level is provided; if the comparator 3222 determines that the sensing voltage value Vs is greater than or equal to the predetermined voltage value VREF, the output current level determination signal SIs at a second logic level is provided. The first logic level is different from the second logic level. The logic operation circuit 3224 includes an AND gate AG configured to perform a logic AND operation on the output current level determination signal SIs and the control signal PS_ON to generate a first signal S1 and provide the first signal S1 to the control terminal of the switch SW of the dummy current providing circuit 324.

Figure 5:
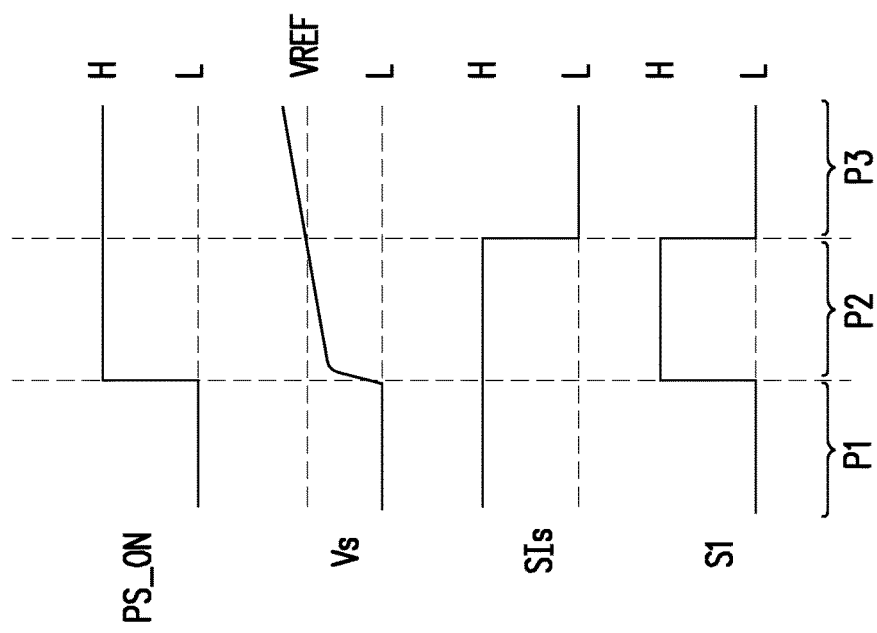
FIG. 5 illustrates an operation waveform according to the second embodiment.

The operation of the control circuit 320 is explained as follows. Please refer to FIG. 3, FIG. 4, and FIG. 5. FIG. 5 illustrates an operation waveform according to the second embodiment. First, in a time period P1, the power supply device 300 has not yet received the control signal PS_ON (which is considered as being at a low voltage level). Hence, the power converter 310 neither converts the input power Vi to provide the output power Vo nor provides any current value Is of the output power Vo to the control circuit 320, so that the inverting input terminal of the comparator 3222 receives the sensing voltage value Vs at the low voltage level. At this time, the comparator 3222 provides the output current level determination signal SIs at a high logic level (e.g., the aforesaid first logic level) according to the comparison result of the predetermined voltage value VREF and the sensing voltage value Vs. The logic operation circuit 3224 then performs the logic AND operation on the output current level determination signal SIs and the control signal PS_ON at the low voltage level to generate the first signal S1 at the low voltage level. The switch SW of the dummy current providing circuit 324 receives the first signal S1 at the low voltage level and is thus switched off; hence, the control circuit 320 in the time period P1 does not provide any dummy current Id.

In a time period P2, the power supply device 300 receives the control signal PS_ON. The power converter 310 converts the input power Vi to provide the output power Vo and provide the current value Is of the output power Vo to the control circuit 320, so that the inverting input terminal of the comparator 3222 starts to receive the sensing voltage value Vs. The logic operation circuit 3224 performs the logic AND operation on the output current level determination signal SIs and the control signal PS_ON to generate the first signal S1 at the high voltage level. The switch SW of the dummy current providing circuit 324 receives the first signal S1 at the high voltage level and is thus switched on; hence, the control circuit 320 in the time period P2 provides the dummy current Id. This allows the current value Is of the output power Vo to rapidly increase at the beginning of the time period P2, and thus the sensing voltage value Vs rapidly increases as well. Since the sensing voltage value Vs is not yet greater than or equal to the predetermined voltage value VREF, the comparator 3222 still provides the output current level determination signal SIs at the high logic level (e.g., the aforesaid first logic level) according to the comparison result of the predetermined voltage value VREF and the sensing voltage value Vs.

Next, since the sum of the current value of the dummy current Id and the current value of the output power Vo continues to increase, i.e., the current value Is of the output power Vo continues to increase, the sensing voltage value Vs received by the comparator 3222 also continues to increase. When the sensing voltage value Vs is greater than or equal to the predetermined voltage value VREF, a time period P3 starts.

In the time period P3, the comparator 3222 provides the output current level determination signal SIs at the low logic level (e.g., the aforesaid second logic level) according to the comparison result of the predetermined voltage value VREF and the sensing voltage value Vs. The logic operation circuit 3224 performs the logic AND operation on the output current level determination signal SIs and the control signal PS_ON to generate the first signal S1 at the low voltage level, so as to switch off the switch SW and stops the control circuit 320 from providing the dummy current Id in the time period P3.

In the present embodiment, note that the determination circuit 322 determines whether to switch on or off the switch SW according to the current value Is of the output power Vo, so as to reduce the power consumption of the dummy current providing circuit 324 in the time period P3.

Figure 6:
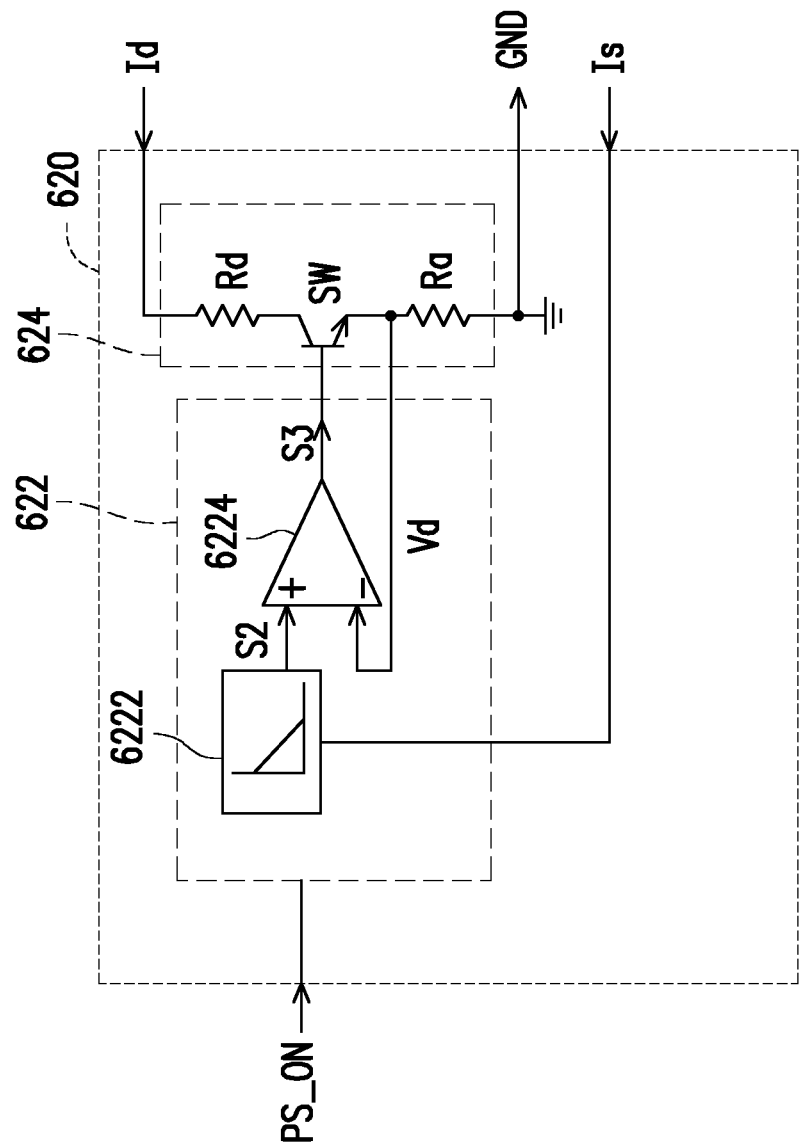
FIG. 6 is a schematic view of a control circuit according to a third embodiment of the disclosure.

Please refer to FIG. 6, which is a schematic view of a control circuit according to a third embodiment of the disclosure. In the present embodiment, the control circuit 620 is applicable to the power converter 310 depicted in FIG. 3. The control circuit 620 includes a determination circuit 622 and a dummy current providing circuit 624. The determination circuit 622 is configured to performs an operation on the current value Is of the output power Vo according to the control signal PS_ON to provide a first signal S2 and generate a second signal S3 according to the dummy voltage Vd and the first signal S2. The determination circuit 622 includes an operator 6222 and an operational amplifier 6224. The operator 6222 is enabled according to the control signal PS_ON. After the operator 6222 is enabled, the operator 6222 performs an operation on the current value Is of the output power Vo to obtain the first signal S2 negatively correlated with the current value Is of the output power Vo. A non-inverting input terminal of the operational amplifier 6224 is coupled to the operator 6222 to receive the first signal S2. An inverting terminal of the operational amplifier 6224 is configured to receive the dummy voltage Vd from the dummy current providing circuit 624. An output terminal of the operational amplifier 6224 is configured to provide the second signal S3. The dummy current providing circuit 624 includes the dummy resistor Rd, the switch SW, and a resistor Ra. The first terminal of the dummy resistor Rd is coupled to the secondary-side conversion circuit 316 to receive the output power Vo. The first terminal of the switch SW is coupled to the second terminal of the dummy resistor Rd. The second terminal of the switch SW is coupled to the determination circuit 622. The control terminal of the switch SW is configured to receive the second signal S3. A first terminal of the resistor Ra is coupled to the second terminal of the switch SW, a second terminal of the resistor Ra is coupled to the reference voltage source and the secondary-side conversion circuit 316, and the resistor Ra is configured to provide the dummy voltage Vd according to the dummy current Id.

In the present embodiment, a voltage value of the first signal S2 and the current value Is of the output power Vo are in a relationship of negative slope or in inverse proportion. Namely, when the current value Is of the output power Vo decreases, the operator 6222 raises the voltage value of the first signal S2. By contrast, when the current value Is of the output power Vo increases, the operator 6222 reduces the voltage value of the first signal S2. Besides, the operational amplifier 6224 also determines a voltage value of the second signal S3 according to the voltage value of the dummy voltage Vd and the first signal S2. The operational amplifier 6224 may perform an operation on the voltage value of the dummy voltage Vd and the first signal S2 to obtain the difference between the voltage value of the dummy voltage Vd and the first signal S2 and gain the difference to obtain the voltage value of the second signal S3. Through the output terminal of the operational amplifier 6224, the operational amplifier 6224 provides the second signal S3 generated according to the control signal PS_ON, the dummy voltage Vd, and the first signal S2 to the dummy current providing circuit 624. The dummy current providing circuit 624 receives the second signal S3 through the control terminal of the switch SW. If the switch SW is the BJT, for instance, the dummy current providing circuit 624 controls the switch SW to be in a saturation region or an active region according to the voltage value of the second signal S3, so as to adjust the current value of the dummy current Id.

For instance, when the current value Is of the output power Vo decreases, the operator 6222 raises the voltage value of the first signal S2 according to the current value Is of the output power Vo. The operational amplifier 6224 performs an operation on the voltage value of the dummy voltage Vd and the first signal S2 to obtain the voltage value of the second signal S3. The dummy current providing circuit 624 raises the current value of the dummy current Id according to the voltage value of the second signal S3. For instance, when the current value Is of the output power Vo increases, the operator 6222 reduces the voltage value of the first signal S2 according to the current value Is of the output power Vo. The operational amplifier 6224 performs an operation on the voltage value of the dummy voltage Vd and the first signal S2 to obtain the voltage value of the second signal S3. The dummy current providing circuit 624 reduces the current value of the dummy current Id through the voltage value of the second signal S3. According to the present embodiment, the current value Is of the output power Vo can be maintained to be equal to or slightly greater than the threshold value. As such, the power consumption of the power supply device can be reduced.

Figure 7:
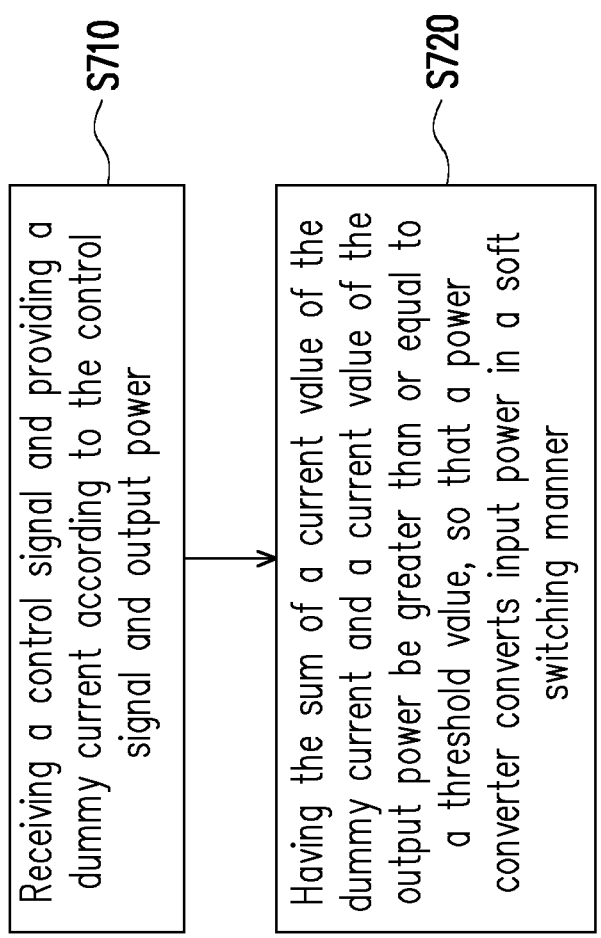
FIG. 7 is a flowchart illustrating a power supply method according to an embodiment of the disclosure.

Please refer to FIG. 7, which is a flowchart illustrating a power supply method according to an embodiment of the disclosure. In step S710, a control signal is received, and a dummy current is provided according to the control signal and output power. In step S720, the sum of the current value of the dummy current and the current value of the output power is greater than or equal to a threshold value, so that the power converter can convert the input power in a soft switching manner. Implementation details of the steps S710 and S720 can be well learned from the embodiments depicted in FIG. 1 to FIG. 6 and thus will not be further described hereinafter.

To sum up, when the power supply device described herein provides the converted output power according to the control signal, the control circuit is configured to receive the control signal and provide the dummy current according to the control signal and the output power. Accordingly, the sum of the current value of the dummy current and the current value of the output power is greater than or equal to the threshold value, whereby the power converter can convert the input power in a soft switching manner. Besides, the power supply device can determine whether to provide and adjust the dummy current according to the current value Is of the output power Vo, so as to further reduce the power consumption of the power supply device.

Although exemplary embodiments of the disclosure have been described in detail above, the disclosure is not limited to specific embodiments, and various modifications and changes may be made within the scope of the disclosure defined in the claims.

What is claimed is:
1. A power supply device, comprising:
  a power converter, comprising:
    a transformer;
    a primary-side conversion circuit, coupled to a primary side of the transformer and configured to receive input power; and
    a secondary-side conversion circuit, coupled to a secondary side of the transformer,
  wherein the power converter controls the primary-side conversion circuit and the secondary-side conversion circuit through a plurality of switch signals, so as to convert the input power to provide output power, wherein the switch signals are generated according to a control signal; and
  a control circuit, coupled to the power converter and configured to receive the control signal and provide a dummy current according to the control signal and the output power, such that a sum of a current value of the dummy current and a current value of the output power is greater than or equal to a threshold value, whereby the power converter converts the input power in a soft switching manner.
2. The power supply device as recited in claim 1, wherein the control circuit comprises:
  a dummy current providing circuit, coupled to the secondary-side conversion circuit and configured to pro- vide the dummy current to the secondary-side conversion circuit according to the control signal and the output power.

3. The power supply device as recited in claim 2, wherein the dummy current providing circuit comprises:
   a dummy resistor, having a first terminal coupled to the secondary-side conversion circuit; and
   a switch, having a first terminal coupled to a second terminal of the dummy resistor and a second terminal coupled to a reference voltage source and the secondary-side conversion circuit,
   wherein when the switch is switched on, the output power provides the dummy current through the dummy resistor.

4. The power supply device as recited in claim 3, wherein the switch further has a control terminal configured to receive the control signal, wherein the switch is switched on according to the control signal.

5. The power supply device as recited in claim 3, wherein the control circuit further comprises:
   a determination circuit, coupled to the control terminal of the switch and configured to receive the output power and the control signal and control the switch to be switched on or off according to the current value of the output power and the control signal.

6. The power supply device as recited in claim 5, wherein the determination circuit comprises:
   a comparator, configured to receive the current value of the output power and provide an output current level determination signal according to the current value of the output power; and
   a logic operation circuit, coupled to the comparator and the dummy current providing circuit and configured to control the switch to be switched on or off according to the output current level determination signal and the control signal.

7. The power supply device as recited in claim 6, wherein:
   an inverting input terminal of the comparator is configured to receive a sensing voltage value generated according to the output power, a non-inverting input terminal of the comparator is configured to receive a predetermined voltage value, and an output terminal of the comparator is configured to provide the output current level determination signal,
   and the comparator is configured to respond to a comparison result of the sensing voltage value and the predetermined voltage value and provide the output current level determination signal.

8. The power supply device as recited in claim 7, wherein:
   if the comparator compares the sensing voltage value and the predetermined voltage value and learns that the sensing voltage value is less than the predetermined voltage value, the comparator provides the output current level determination signal at a first logic level,
   if the comparator learns that the sensing voltage value is greater than or equal to the predetermined voltage value, the comparator provides the output current level determination signal at a second logic level, and
   the first logic level is different from the second logic level.

9. The power supply device as recited in claim 8, wherein:
   the logic operation circuit comprises an AND gate configured to perform a logic AND operation on the output current level determination signal and the control signal to generate a first signal,
   the logic operation circuit switches on the switch according to the first signal at the first logic level, such that the dummy current providing circuit provides the dummy current, and
   the logic operation circuit switches off the switch according to the first signal at the second logic level, such that the dummy current providing circuit stops providing the dummy current.

10. The power supply device as recited in claim 2, wherein the control circuit further comprises:
    a determination circuit, configured to perform an operation on the current value of the output power to provide a first signal and generate a second signal according to a dummy voltage and the first signal,
    wherein the dummy current providing circuit further receives the second signal and the output power, adjusts the dummy current according to the second signal, and provides the dummy voltage to the determination circuit according to the dummy current.

11. The power supply device as recited in claim 10, wherein the dummy current providing circuit comprises:
    a dummy resistor having a first terminal coupled to the secondary-side conversion circuit,
    a switch having a first terminal coupled to a second terminal of the dummy resistor, a second terminal coupled to the determination circuit, and a control terminal configured to receive the second signal, and
    a resistor having a first terminal coupled to the second terminal of the switch and a second terminal coupled to a reference voltage source and the secondary-side conversion circuit, the resistor being configured to provide the dummy voltage according to the dummy current,
    wherein when the switch is switched on, the output power provides the dummy current through the dummy resistor.

12. The power supply device as recited in claim 11, wherein the determination circuit comprises:
    an operator, enabled according to the control signal and configured to perform an operation on the current value of the output power to obtain the first signal, wherein a voltage value of the first signal and the current value of the output power are negatively correlated; and
    an operational amplifier having a non-inverting input terminal configured to receive the first signal, an inverting input terminal configured to receive the dummy voltage, and an output terminal configured to provide the second signal.

13. The power supply device as recited in claim 11, wherein a sum of the current value of the dummy current provided by the dummy current providing circuit according to the second signal and the current value of the output power is greater than or equal to the threshold value.

14. A power supply method adapted to control a power converter by a control circuit, the power converter comprising a transformer, a primary-side conversion circuit, and a secondary-side conversion circuit, wherein the primary-side conversion circuit is coupled to a primary side of the transformer and configured to receive input power, the power converter controls the primary-side conversion circuit and the secondary-side conversion circuit through a plurality of switch signals, so as to convert the input power to provide output power, wherein the switch signals are generated according to a control signal, the power supply method comprising:

receiving, by the control circuit, the control signal and providing a dummy current to the secondary-side conversion circuit according to the control signal and the output power; and enabling, by the control circuit, a sum of a current value of the dummy current and a current value of the output power is greater than or equal to a threshold value, whereby the power converter converts the input power in a soft switching manner.

15. The power supply method as recited in claim 14, wherein the step of providing the dummy current to the secondary-side conversion circuit according to the control signal and the output power comprises:

receiving, by the control circuit, a sensing voltage value generated according to the current value of the output power; and providing, by the control circuit, an output current level determination signal in response to a comparison result of the sensing voltage value and a predetermined voltage value.

16. The power supply method as recited in claim 15, wherein the control circuit comprises a determination circuit configured to receive the output power and the control signal, wherein the step of providing the output current level determination signal in response to the comparison result of the sensing voltage value and the predetermined voltage value comprises:

if the determination circuit compares the sensing voltage value is less than the predetermined voltage value according to the comparison result, providing the output current level determination signal at a first logic level, and if the determination circuit compares the sensing voltage value is greater than or equal to the predetermined voltage value according to the comparison result, providing the output current level determination signal at a second logic level, wherein the first logic level is different from the second logic level.

17. The power supply method as recited in claim 16, wherein the control circuit further comprises a dummy current providing circuit coupled to the determination circuit and the secondary-side conversion circuit, wherein the step of providing the dummy current to the secondary-side conversion circuit according to the control signal and the output power further comprises:

performing a logic AND operation on the output current level determination signal and the control signal to generate a first signal by the determination circuit;

providing the dummy current by the dummy current providing circuit according to the first signal at the first logic level generated by the determination circuit; and stopping providing the dummy current by the dummy current providing circuit according to the first signal at the second logic level generated by the determination circuit.

18. The power supply method as recited in claim 14, wherein the control circuit comprises a determination circuit and a dummy current providing circuit coupled to the determination circuit and the secondary-side conversion circuit, wherein the step of providing the dummy current to the secondary-side conversion circuit according to the control signal and the output power comprises:

performing, by the determination circuit, an operation on the current value of the output power according to the control signal to provide a first signal and providing a dummy voltage according to the dummy current provided by the dummy current providing circuit;

generating a second signal according to the dummy voltage and the first signal by the determination circuit; and receiving the second signal and the output power and adjusting the dummy current according to the second signal by the determination circuit.

19. The power supply method as recited in claim 18, wherein the step of performing, by the determination circuit, an operation on the current value of the output power according to the control signal to provide the first signal and providing the dummy voltage according to the dummy current provided by the dummy current providing circuit comprises:

enabling, a voltage value of the first signal negatively correlated with the current value of the output power by the determination circuit.

20. The power supply method as recited in claim 18, wherein the step of enabling, by the control circuit, the sum of the current value of the dummy current and the current value of the output power is greater than or equal to the threshold value comprises:

enabling, by the control circuit, a sum of the current value of the dummy current according to the second signal provided by the determination circuit and the current value of the output power is greater than or equal to the threshold value.

* * * * *